E. GOEKE.
PAIL TILTING DEVICE.
APPLICATION FILED OCT. 1, 1909.
950,444.
Patented Feb. 22, 1910.
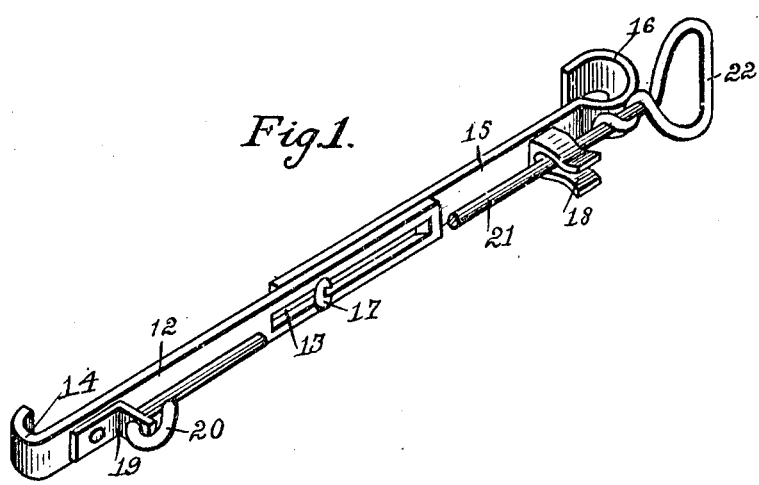
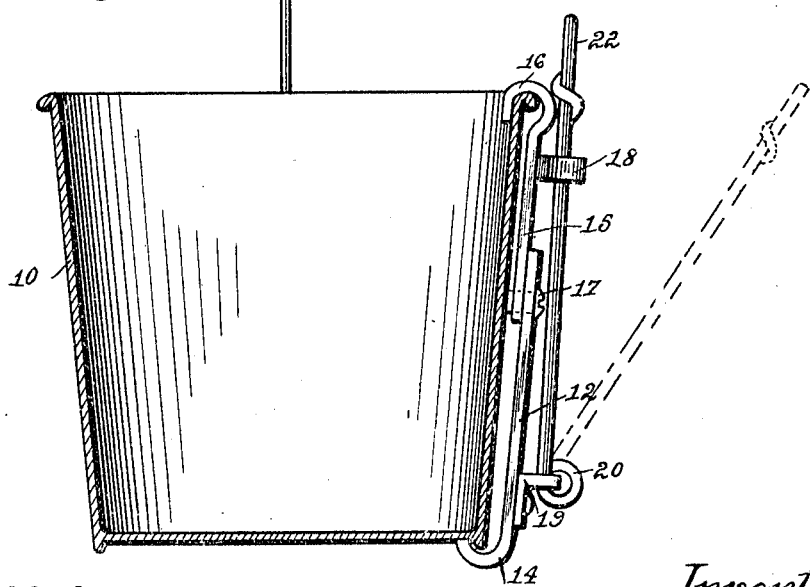
Witnesses.
W. A. Loftus
A. G. Hague
Inventor.
Ernest Goeke.
by Drury & Lane Attys

UNITED STATES PATENT OFFICE.

ERNEST GOEKE, OF BAXTER, IOWA.

PAIL-TILTING DEVICE.

950,444.  Specification of Letters Patent.  Patented Feb. 22, 1910.

Application filed October 1, 1909. Serial No. 520,540.

*To all whom it may concern:*

Be it known that I, ERNEST GOEKE, a citizen of the United States, residing at Baxter, in the county of Jasper and State of Iowa, have invented a certain new and useful Pail-Tilting Device, of which the following is a specification.

The object of my invention is to provide a device of simple, durable, and inexpensive construction, designed to be quickly and easily applied to a pail for the purpose of providing a tilting device that may be grasped in the operator's hand, and by which the pail may be easily and conveniently tilted for the purpose of pouring out the contents thereof without having the hands of the operator come in contact with the contents of the pail.

A further object is to provide a device of this kind that may be readily and easily folded up into a small space for packing, shipping and storing.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a perspective view of a device embodying my invention, and Fig. 2 shows a sectional view of a pail having my improved pail tilting device applied thereto. The dotted lines show the position of the handle of the pail tilting device when extended outwardly from the pail to be grasped by an operator.

Referring to the accompanying drawings, I have used the reference numeral 10 to indicate a pail of ordinary construction having a handle 11.

My invention comprises a support for the tilting handle which support is made of two pieces of flat metal, the part 12 being provided with a slot 13 and a hook 14, the latter being designed to pass under the chime at the bottom of the pail. The other part of the support comprises a flat metal bar 15 having a hook 16 at its upper end designed to pass over the rim at the top of a pail. A bolt 17 is passed through the slot 13 and through the part 15 whereby said parts may be adjusted longitudinally relative to each other and secured in any position of their adjustment. On the part 15 is a spring retaining device 18, the sides of which are arranged to yield to admit the handle, hereinafter described, between them. On the part 12 is a lug 19 having an opening therein in which the hook 20 is placed. This hook is formed on the lower end of the handle 21 which comprises a straight, round rod with a grip 22 formed at its upper end. The said rod 21 is designed to enter the spring retaining device 18.

In practical operation, I apply the device to a pail as follows: First the hook 14 is placed under the chime at the bottom of the pail and then the hook 16 is placed over the rim of the pail. Then the parts are clamped together in position by means of the bolt 17. In this way, the support becomes firmly attached to the pail. The operator then grasps the handle 11 of the pail in one hand and the grip 22 in the other hand, whereupon the pail may be tilted to any desired angle and conveniently and easily supported in any desired position so that the operator may dip up material with the pail or may pour material out of the pail without having his hands come in contact with said material.

The spring retaining device 18 is very convenient in holding the handle of the tilting device in an elevated position when applied to a pail, and it is also convenient in holding the handle parallel with the supporting device for convenience in shipping and storing.

I claim as my invention:

1. A pail tilting device, comprising a support formed of two parts adjustably connected with each other and having hooks at their opposite ends, and a rod pivotally connected to the lower member and having a grip at its upper end designed to be grasped by an operator.

2. A pail tilting device, comprising a support formed of two parts adjustably connected with each other and having hooks at their opposite ends, and a rod pivotally connected to the lower member and having a grip at its upper end designed to be grasped by an operator, and a spring retaining device for said handle.

3. A device of the class described, comprising a support formed of two pieces of flat metal, the lower one being provided with a hook at its lower end and with a lug at its central portion, the upper one being provided with a hook at its upper end, and a spring retaining device at its central portion, an adjusting means, comprising a bolt, a slot for adjustably connecting said parts, and a handle member comprising a rod having a loop at its lower end pivotally connected to said lug, and a gripping member at its upper end, said handle member being designed to enter said spring retaining device, substantially as and for the purposes stated.

Des Moines, Iowa, September 1, 1909.

ERNEST GOEKE.

Witnesses:
FRED HAGER,
CHAS. BURDECK.